Jan. 1, 1929. Re. 17,178

E. W. TRAPP

APPARATUS FOR VENDING MERCHANDISE

Original Filed July 23, 1921 2 Sheets-Sheet 1

INVENTOR.
E. W. TRAPP
BY Joseph B. Gardner
ATTORNEY.

Jan. 1, 1929. Re. 17,178

E. W. TRAPP

APPARATUS FOR VENDING MERCHANDISE

Original Filed July 23, 1921 2 Sheets-Sheet 2

INVENTOR.
E. W. TRAPP
BY Joseph B. Gardner
ATTORNEY.

Reissued Jan. 1, 1929. Re. 17,178

UNITED STATES PATENT OFFICE.

EDWIN W. TRAPP, OF SAN FRANCISCO, CALIFORNIA, ASSIGNOR, BY MESNE ASSIGNMENTS, TO MUTUAL STORES, INC., A CORPORATION OF CALIFORNIA.

APPARATUS FOR VENDING MERCHANDISE.

Original No. 1,510,435, dated September 30, 1924, Serial No. 487,157, filed July 23, 1921. Application for reissue filed September 27, 1926. Serial No. 138,091.

My invention relates to an improved apparatus and arrangement for displaying merchandise contained in fixtures which permit self-serving.

An object of the invention is to provide an apparatus of the character described in which the fixtures containing the merchandise are so arranged that as the customer proceeds along the aisle in front of the fixtures, a maximum amount of the different merchandise will be clearly displayed before him.

Another object is to arrange the fixtures so that a maximum amount of goods may be displayed on a given floor space.

A further object is to provide an apparatus in which fixtures of the above mentioned type are arranged on opposite sides of the aisle in a manner to permit of a uniform width of the latter.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings.

Figure 1:
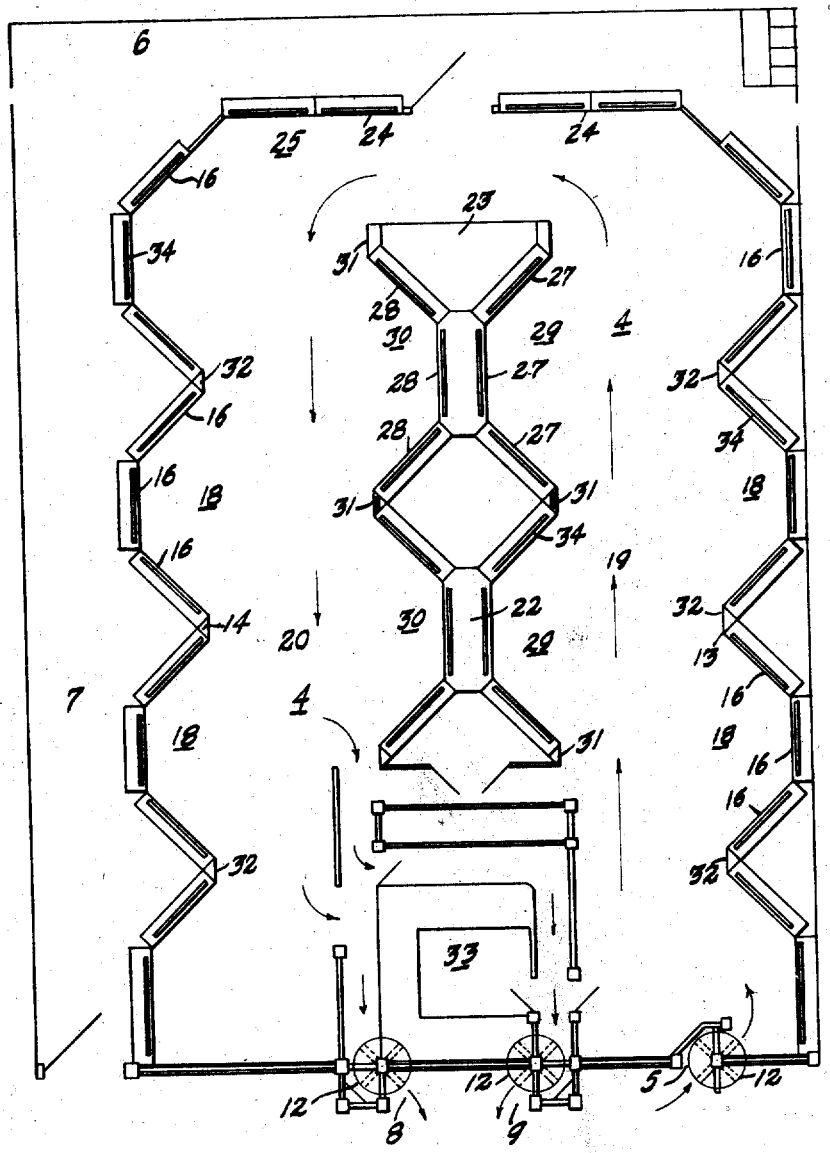
Figure 1 is a plan view of the interior of a store equipped with the apparatus of my invention.
Figure 2:
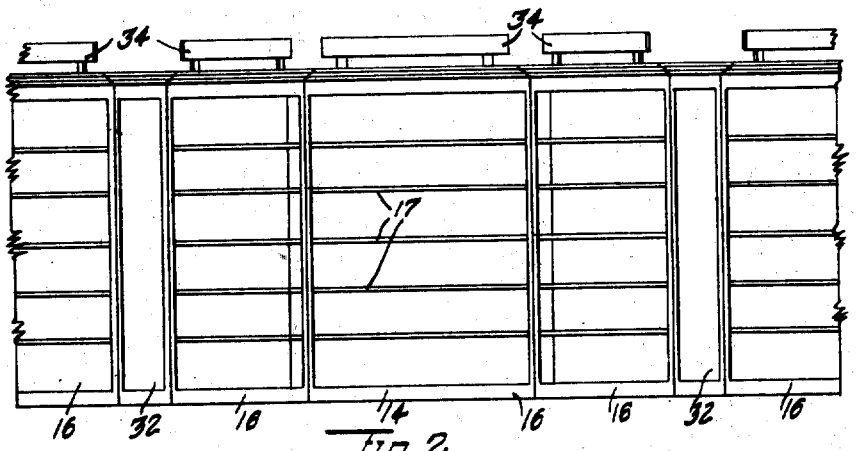
Figure 2 is a side elevation of some of the fixtures or merchandise holders which are arranged to be located on the opposite sides of the centrally located fixtures.
Figure 3:
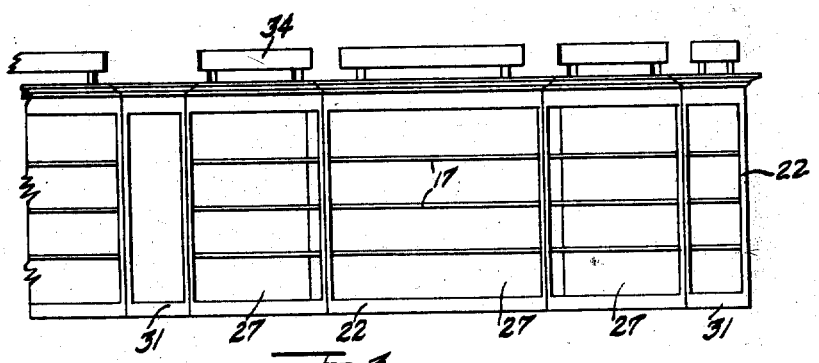
Figure 3 is a side elevation of the central fixtures.

The apparatus of my invention is particularly adapted for use in connection with stores of the self-serving type, that is, where the customer is given access to the merchandise in the store and is permitted to serve himself. As here illustrated the store is provided with a sales department or section 4 and suitable private storing sections and passages 6 and 7 respectively.

The sales department 4 is preferably provided at its front end with an entrance 5 and exits 8 and 9, all of which are provided with turning stiles 12 which revolve in one direction only. Preferably positioned at the opposite sides of the department 4 are fixtures 13 and 14 comprising as here shown a plurality of cabinets 16 which contain the merchandise offered for sale, each cabinet being open at the front and provided with suitable shelving 17 for the support and display of the merchandise. The cabinets are preferably arranged edge to edge and in angular relation so that a series of alcoves 18 are formed thereby, the cabinets in each alcove being disposed in planes perpendicular to lines emanating from a common point. In this manner as the customer proceeds along the aisle 19 or 20 in front of the fixtures and enters the area adjacent an alcove, substantially the entire merchandise displayed in the cabinets in said alcove will be exposed to him at a single glance, thereby not only enabling the customer to do his buying expeditiously, but to bring to his attention articles which he was in need of but otherwise would have overlooked. It will further be noted that the foregoing arrangement of cabinets permits of the display of a maximum amount of merchandise as well as maximum aisle room on a given area of floor space. It will be likewise noted that, as here shown, the merchandise presenting structure defining each alcove is formed with a pair of side portions coterminous with a back portion at opposite ends thereof and forming with said back portion angles in excess of ninety degrees. In this manner, sharp corners are avoided in the alcoves so that the goods at the junctures of the portions or cabinets are as accessible as those at the other parts of the portions and none of the portions are presented with undue obliquity to the line of vision of a customer as ordinarily positioned to view the goods in an alcove.

Between the aisles 19 and 20 is a central fixture 22 whose rear end 23 is spaced from the cabinets 24 at the corresponding end 25 of the salesroom so that a continuous passage is had between the entrance 5 to the exits 8 and 9. The fixture 22 is formed of a plurality of cabinets 27 and 28 which face the aisles 19 and 20 respectively, and are arranged similar to the cabinets 16 so as to form alcoves 29 and 30. By referring to Figure 1 of the drawings it will be seen that the alcoves of the center fixture are disposed in staggered relation with respect to the alcoves of the adjacent side fixtures thus providing a uniform width of aisle or passage between the opposing fixtures; furthermore the edges 31 of the alcoves of the center fixture and the edges 32 of the side fixtures are spaced transversely across the aisle a distance sufficient to allow the customer to pass through the aisles in a straight line if he desires.

The cabinets comprising the side fixtures 13 and 14 are made as high as practical, whereas the cabinets of the center fixture are preferably of a height not exceeding the horizontal line of vision of the average customer. In this manner the operator at the cashier's station 33, as well as the customers in the store, will have a more or less full view of the entire sales department.

For the convenience of the patrons the top of each cabinet is preferably provided with a sign 34 which indicates the general nature of the merchandise contained on the shelves of the cabinet.

I claim:

1. An apparatus for vending merchandise, comprising a plurality of merchandise display cabinets adapted for self-serving and arranged on opposite sides of an aisle, the cabinets on one side of the aisle being arranged to face the cabinets on the other side, and adjacent cabinets on each side of the aisle being obliquely related and disposed to define alcove spaces, the alcoves on one side of the aisle being removed from and arranged in staggered relation to the alcove spaces on the other side.

2. An apparatus for vending merchandise, comprising a plurality of merchandise display cabinets adapted for self-serving and arranged on opposite sides of an aisle, the cabinets on each side of the aisle being arranged to form a series of alcoves, the alcove spaces of one series being entirely without and arranged in staggered relation to the alcove spaces of the other.

3. An apparatus for vending merchandise, comprising a plurality of merchandise display cabinets adapted for self-serving and arranged to define a series of alcoves on opposite sides of an aisle in staggered relation, the cabinets defining each alcove being positioned to lie in planes substantially perpendicular to lines emanating from a common point lying without the alcove and in front of the cabinets.

4. In a self-serving store having a shopping area, merchandise vending apparatus comprising merchandise display sections defining in plan a series of polygonal alcoves opening into said area, each alcove being formed by at least three of said sections disposed in contiguous and end-to-end relation, and lying in planes perpendicular to lines emanating from a common point without the alcove and making only obtuse angles with each other.

5. In a self-serving store having a shopping area, merchandise vending apparatus comprising sets of merchandise display sections arranged on opposite sides of an aisle and each defining a series of polygonal alcoves opening into said aisle, each alcove being formed by at least three of said sections with each of the sections of an alcove defining an obtuse angle with the adjacent sections of such alcove and lying in planes perpendicular to lines emanating from a common point without the alcove, the alcoves of one series being arranged in staggered relation to the alcoves of the other, said sets of sections being so spaced as to permit a straight passage for a person therebetween.

6. An apparatus for vending merchandise comprising a plurality of merchandise display cabinets adapted for self-serving and arranged on opposite sides of a common aisle, the cabinets on each side of the aisle being arranged to form a series of alcoves with the areas embraced by the alcoves of one series spaced from those of the other series whereby a straight passage may be defined between opposed alcoves.

7. In a self-serving store, a sales area, a checker's stand adjacent the front thereof, shelving positioned mediately of the sides of said sales area and extending rearwardly from adjacent said stand, said shelving being arranged to divide said sales area into sales aisles and defining alcoves on opposite sides thereof facing said aisles.

8. In a self-serving store, a sales area, merchandise display cabinets extending along the sides of said area from the front to the rear thereof and defining in plan a plurality of three sided alcoves opening into said area, the sides of said alcoves being perpendicular to lines emanating from a common point without the alcove and lying in front of all the alcove sides, merchandise display cabinets interposed between said first cabinets and dividing said area into shopping aisles, said latter cabinets having alcoves similar to and facing those of the first mentioned cabinets, the alcoves of the cabinets on one side of the sales area being aligned and opposed to the alcoves of the cabinets on the other side thereof but in staggered and opposed relation to the alcoves of said intermediate cabinets, and each of the alcoves being without the area of each and all of the other alcoves.

9. In a self serving store the combination with a lobby provided with entrance and exit gates and checkers' stands, of shelves on opposite sides of the store in rear of the checkers' stands and arranged in zigzag fashion to define sets of alcoves extending from front to rear of the store along the opposite sides thereof and enclosing an open space forming a salesroom, the shelves being so arranged that they are presented to view of the checkers and a greater length of shelf room is provided, and shelving positioned mediately of the said sides of the store and defining a series of alcoves lying in opposed and staggered relation to the alcoves of said sets.

10. A self-serving store having an entrance lobby controlled by gates and an exit passage, a checker's stand in the front part of the store, shelves arranged along the side walls of the store in zigzag fashion to define alcoves and having all portions thereof in full view of the checker's stand, and shelves interposed between said first shelves and running in zigzag fashion from adjacent said checkers' stand to the rear portion of the store to define alcoves facing said first alcoves, the top of said last shelving being lower than the top of said first shelving.

11. An apparatus for vending merchandise comprising opposed rows of merchandise display cabinets placed in contiguous end-to-end relation in their rows, the rows of cabinets cooperating to define between them a continuously progressing zigzag aisle extending longitudinally of the rows.

In testimony whereof, I have hereunto set my hand at Oakland, Calif., this 22nd day of September, 1926.

EDWIN W. TRAPP.